C. F. JENKINS.
MOTION PICTURE SHUTTER.
APPLICATION FILED JULY 18, 1918.
1,308,494.
Patented July 1, 1919.
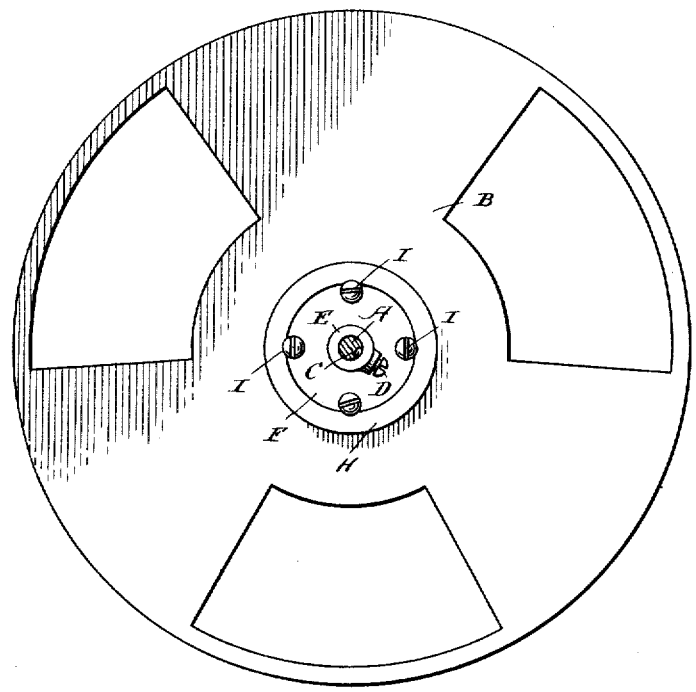
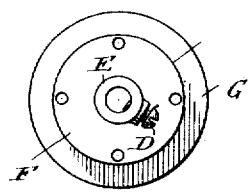
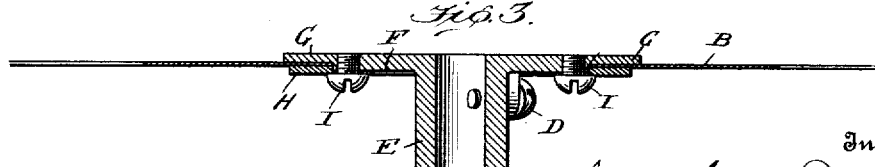

UNITED STATES PATENT OFFICE.

CHARLES FRANCIS JENKINS, OF WASHINGTON, DISTRICT OF COLUMBIA.

MOTION-PICTURE SHUTTER.

1,308,494.  Specification of Letters Patent.  Patented July 1, 1919.

Application filed July 18, 1918. Serial No. 245,483.

*To all whom it may concern:*

Be it known that I, CHARLES FRANCIS JENKINS, a citizen of the United States, and resident of Washington, in the District of Columbia, have invented certain new and useful Improvements in Motion-Picture Shutters, of which the following is a specification, reference being had therein to the accompanying drawing.

In motion picture machines it is desirable that the shutter should be very light, readily adjusted about and along its axis of rotation, secure in adjusted positions, and that the very thin plate should be easily adjusted and replaced, at slight cost. It is the object of this invention to secure these desirable features.

It is common to use a somewhat thin plate permanently fixed to a small hub which is moved for all adjustments and fixed in adjusted position by a set screw. This method is not entirely satisfactory because slight movement often destroys the perfection of adjustment, the shutter plate if very thin is often broken at the hub, and all the adjusting steps must be repeated as often as the shutter is in any degree displaced, purposely or by accident.

In the accompanying drawings,

Figure 1 is a face view of a shutter made in accordance with my invention.

Fig. 2 is a similar view, certain parts being omitted.

Fig. 3 is an enlarged diametrical section of a portion of the shutter when on its shaft.

In these views, A represents a shutter shaft, B a shutter plate. The shaft is provided with a longitudinal groove C and in this fits the end portion of a set screw D carried by a hub E which has a flange F of a diameter many times that of the shaft and peripherally cut away on one lateral face to form a boss F concentric with the shaft and surrounded by a thinner annular portion G. The shutter plate has a central opening to permit it to fit over the boss and rest against the thin surrounding portion of the flange where it is held by a plane concentric ring H secured by the heads of screws I working in the flange and overlapping the ring. It may be noted that the heads make contact only with the ring and that the tendency is to tilt the screws and prevent their accidental rotation. The boss holds the plate concentric with the shaft and the screws cause the annular inner portion of the plate to be gripped between the ring and the corresponding portion of the flange, thus holding it frictionally at all points around the large contact ring which is far from the axis of the shaft. It follows that any adjustment made is never varied accidentally, and that it is quite feasible to use a plate so thin that it could not be safely held by a small hub nor by screws passing directly though it. Obviously by slightly loosening the screws the plate is free enough to permit rotary adjustment with respect to the shaft, and both plate and ring may be removed if part of the screws be withdrawn, two screws being removed if there be four equally spaced about the shaft, or one screw if there be but three so spaced.

When the plate is once properly adjusted and the screws are tightened, the entire shutter may be removed by loosening the set screw and may be replaced at any time without changing the original adjustment.

Preferably the shutter plate is very thin and cut from plane sheet metal, so that its cost is trifling. It is so made because it has not been found practically feasible to make a shutter so heavy that it is never deformed in use. By making the sheet as set forth, replacing it when injured, is a simple and inexpensive matter, requiring only temporary removal of one or two screws, nothing else being replaced or disturbed.

It often happens that when a shutter is perfectly adjusted angularly with respect to its shaft or axis and is exactly coördinated with the film moving mechanism, it is necessary to adjust it along that axis. With ordinary machines, adjusting along the axis makes it necessary to change or verify the other adjustment, but this invention makes the two adjustments independent, the shutter being movable back and forth along its shaft without in any way changing its angular adjustment.

What I claim is:

1. A shutter having a hub with a slightly raised concentric boss of a diameter many times that of the shutter shaft, a thin shutter plate perforated to fit over the boss, a concentric annular clamping plate resting upon the shutter plate outside the peripheral line of the boss, and adjustable clamping devices carried by the boss and overlapping upon the clamping plate.

2. The combination with a shutter shaft, of a hub provided with a plane annular flange having on one face a slightly raised circular boss, a thin shutter plate centrally perforated to fit over the boss, a plane annular plate concentric with and larger than the boss and resting upon the inner marginal portion of the shutter plate, and means carried by the boss for adjustably pressing said annular plate toward that portion of the hub surrounding the boss.

3. The combination with a shutter shaft, of a hub provided with a plane annular flange having on one face a slightly raised concentric boss, a thin shutter plate centrally perforated to fit over said boss, a plane annular plate concentric with and larger than the boss and resting upon the inner marginal portion of the shutter plate, and screws working in the boss and having heads overlapping the inner margin of said annular plate, said boss being in diameter many times the diameter of the shutter shaft.

In testimony whereof I hereunto affix my signature.

CHARLES FRANCIS JENKINS.

Copies of this patent may be obtained for five cents each, by addressing the "Commissioner of Patents, Washington, D. C."